US012625299B2

(12) United States Patent
Hirayama et al.

(10) Patent No.: US 12,625,299 B2
(45) Date of Patent: May 12, 2026

(54) CALCIUM FLUORIDE POLYCRYSTALLINE SUBSTANCE, PRODUCTION METHOD OF CALCIUM FLUORIDE PARTICLE, PRODUCTION METHOD OF CALCIUM FLUORIDE POLYCRYSTALLINE SUBSTANCE, OPTICAL ELEMENT, OPTICAL SYSTEM, INTERCHANGEABLE LENS AND OPTICAL DEVICE

(71) Applicant: NIKON CORPORATION, Tokyo (JP)

(72) Inventors: Mariko Hirayama, Tokyo (JP); Hitoshi Ishizawa, Kawasaki (JP); Takuro Nakamura, Yamato (JP); Yoshinobu Ezura, Yokohama (JP); Yuya Yamamoto, Machida (JP)

(73) Assignee: NIKON CORPORATION, Tokyo (JP)

( * ) Notice: Subject to any disclaimer, the term of this patent is extended or adjusted under 35 U.S.C. 154(b) by 382 days.

(21) Appl. No.: 18/211,132

(22) Filed: Jun. 16, 2023

(65) Prior Publication Data
US 2023/0333283 A1 Oct. 19, 2023

Related U.S. Application Data

(63) Continuation of application No. PCT/JP2021/048842, filed on Dec. 28, 2021.

(30) Foreign Application Priority Data

Dec. 28, 2020 (WO) ................. PCT/JP2020/049265

(51) Int. Cl.
*G02B 1/02* (2006.01)
*G02B 7/14* (2021.01)

(52) U.S. Cl.
CPC ................. *G02B 1/02* (2013.01); *G02B 7/14* (2013.01)

(58) Field of Classification Search
CPC ........ G02B 1/02; G02B 7/14; G02B 21/0076; C04B 2235/602; C04B 2235/608; C04B 2235/662; C04B 35/62625; C04B 2235/3208; C04B 2235/441; C04B 2235/65; C04B 2235/77; C04B 2235/9653; C04B 35/553; C01F 11/22
See application file for complete search history.

(56) References Cited

U.S. PATENT DOCUMENTS

| | | | | | |
|---|---|---|---|---|---|
| 3,359,066 A | * | 12/1967 | Hatch | ...................... | G02B 1/02 359/356 |
| 4,038,201 A | * | 7/1977 | Hargreaves | ............. | C30B 11/00 423/490 |
| 2004/0212107 A1 | * | 10/2004 | Hasegawa | ............. | C04B 35/645 264/1.21 |
| 2005/0115490 A1 | | 6/2005 | Meyer-Fredholm et al. | | |

(Continued)

FOREIGN PATENT DOCUMENTS

| | | |
|---|---|---|
| CN | 104692440 A | 6/2015 |
| CN | 107200582 A | 9/2017 |

(Continued)

OTHER PUBLICATIONS

Extended European Search Report dated Nov. 25, 2024 for European Application 21915315.2.

(Continued)

*Primary Examiner* — Mariam Qureshi

(57) ABSTRACT

A calcium fluoride polycrystalline substance, in which the internal transmittance of light having a wavelength of 550 nm per thickness of 10 mm is 98% or more.

30 Claims, 15 Drawing Sheets

(56)                References Cited

U.S. PATENT DOCUMENTS

| 2006/0038194 A1* | 2/2006 | Terashima | G02B 1/02 |
| | | | 257/98 |
| 2014/0239228 A1* | 8/2014 | Ishizawa | C09K 11/7733 |
| | | | 252/301.4 S |
| 2015/0107768 A1* | 4/2015 | Uehara | C04B 35/553 |
| | | | 156/308.2 |
| 2023/0333283 A1 | 10/2023 | Hirayama et al. | |

FOREIGN PATENT DOCUMENTS

| CN | 107628813 A | 1/2018 |
| JP | 2003-300777 A | 10/2003 |
| JP | 2006-206359 A | 8/2006 |
| RU | 2559974 C1 | 8/2015 |
| WO | WO 2022/145019 A1 | 7/2022 |
| WO | WO 2022/145457 A1 | 7/2022 |

OTHER PUBLICATIONS

Office Action issued Mar. 1, 2025 for International Application No. 202180079945.5.

Chinese Office Action dated Sep. 19, 2024 for Chinese Application No. 202180079945.5.

Japanese Office Action dated Oct. 1, 2024 for Japanese Application No. 2022-573108.

Japanese Office Action dated Oct. 1, 2024 for Japanese Application No. 2022-572861.

Crystal material brochure Calcium Fluorite $CaF_2$, (Known as: Fluorite), Canon Optron, Inc., 2018, (4 pages).

International Search Report dated Feb. 8, 2022 for International Application No. PCT/JP2021/048842.

Written Opinion of the International Searching Authority dated Feb. 8, 2022 for International Application No. PCT/JP2021/048842.

Chinese Office Action dated Apr. 15, 2024 for Chinese Application No. 202180079945.5.

Japanese Office Action dated May 7, 2024 for Japanese Application No. 2022-573108.

Japanese Office Action dated May 7, 2024 for Japanese Application No. 2022-572861.

Japanese Office Action dated Oct. 3, 2023 for Japanese Application No. 202-572861.

Japanese Office Action dated Oct. 3, 2023 for Japanese Application No. 2022-572861.

* cited by examiner

FIG. 7

| SAMPLE | 1 | 2 | 3 | 4 | 5 | 6 | 7 | 8 | 9 | 10 | 11 | 12 |
|---|---|---|---|---|---|---|---|---|---|---|---|---|
| TRANSMITTANCE | 98.1 | 98.2 | 98.4 | 98.6 | 98.4 | 99.0 | 99.32 | 99.15 | 98.7 | 98.4 | 99.4 | 99.0 |
| OPTICAL STRAIN (nm/cm) | 7.3 | 7.9 | 4.4 | 5.8 | 5.3 | 5.9 | 4.7 | 6.83 | 9.0 | 8.1 | 7.8 | 7.9 |
| F/Ca RATIO | 2.5 | 2.5 | 3 | 3 | 3.5 | 3.5 | 3.5 | 3.5 | 3.5 | 3.5 | 3.5 | 3.5 |
| HYDROFLUORIC ACID CONCENTRATION (%) | 10 | 5 | 0.1 | 5 | 0.1 | 0.1 | 0.1 | 0.1 | 1 | 1 | 1 | 2.5 |
| HYDROTHERMAL TEMPERATURE (°C) | 140 | 140 | 130 | 170 | 140 | 170 | 170 | 170 | 170 | 170 | 180 | 170 |
| NUMBER OF TIMES OF WATER WASHING (TIMES) | 5 | 5 | 5 | 5 | 5 | 5 | 5 | 5 | 5 | 5 | 5 | 5 |
| DRYING TEMPERATURE (°C) | 580 | 580 | 500 | 620 | 600 | 400 | 625 | 620 | 620 | 620 | 620 | 620 |
| INERT ATMOSPHERE SINTERING TEMPERATURE | 1060 | 1060 | 1000 | 950 | 1000 | 1000 | 1000 | 1000 | 1000 | 1000 | 1000 | 1000 |
| HIP TEMPERATURE (°C) | 1060 | 1060 | 1060 | 1060 | 1050 | 1060 | 1060 | 1060 | 1060 | 1060 | 1060 | 1060 |

FIG. 8

| SAMPLE | 13 | 14 | 15 | 16 | 17 | 18 | 19 | 20 | 21 | 22 | 23 | 24 |
|---|---|---|---|---|---|---|---|---|---|---|---|---|
| TRANSMITTANCE | 98.82 | 98.1 | 98.3 | 98.2 | 99.1 | 98.27 | 98.52 | 98.8 | 99.5 | 98.4 | 98.6 | 99.1 |
| OPTICAL STRAIN (nm/cm) | 3.77 | 9.4 | 2.9 | 6.7 | 6.6 | 8.14 | 3.39 | 9.0 | 9.3 | 8.6 | 3.7 | 3.2 |
| F/Ca RATIO | 3.5 | 3.5 | 3.5 | 3.5 | 3.5 | 3.5 | 3.5 | 3.5 | 3.5 | 3.5 | 3.5 | 3.5 |
| HYDROFLUORIC ACID CONCENTRATION (%) | 5 | 5 | 5 | 5 | 5 | 10 | 10 | 10 | 10 | 10 | 5 | 0.1 |
| HYDROTHERMAL TEMPERATURE (°C) | 170 | 160 | 170 | 130 | 180 | 170 | 180 | 170 | 180 | 170 | 170 | 170 |
| NUMBER OF TIMES OF WATER WASHING (TIMES) | 5 | 5 | 5 | 5 | 5 | 5 | 5 | 5 | 5 | 5 | 5 | 5 |
| DRYING TEMPERATURE (°C) | 610 | 600 | 610 | 580 | 625 | 610 | 620 | 620 | 620 | 620 | 625 | 625 |
| INERT ATMOSPHERE SINTERING TEMPERATURE | 1000 | 1000 | 1000 | 1000 | 1000 | 1000 | 1000 | 1000 | 1000 | 1000 | 1000 | 1000 |
| HIP TEMPERATURE (°C) | 1055 | 1050 | 1050 | 1060 | 1060 | 1050 | 1050 | 1060 | 1060 | 1060 | 1055 | 1055 |

| | |
|---|---|
| SAMPLE | 25 |
| TRANSMITTANCE | 100 |
| OPTICAL STRAIN (nm/cm) | 21.3 |
| F/Ca RATIO | 3.5 |
| HYDROFLUORIC ACID CONCENTRATION (%) | 10 |
| HYDROTHERMAL TEMPERATURE (°C) | 120 |
| NUMBER OF TIMES OF WATER WASHING (TIMES) | 5 |
| DRYING TEMPERATURE (°C) | 400 |
| INERT ATMOSPHERE SINTERING TEMPERATURE (°C) | 1000 |
| HIP TEMPERATURE (°C) | 1060 |

CALCIUM FLUORIDE POLYCRYSTALLINE SUBSTANCE, PRODUCTION METHOD OF CALCIUM FLUORIDE PARTICLE, PRODUCTION METHOD OF CALCIUM FLUORIDE POLYCRYSTALLINE SUBSTANCE, OPTICAL ELEMENT, OPTICAL SYSTEM, INTERCHANGEABLE LENS AND OPTICAL DEVICE

CROSS-REFERENCE TO RELATED APPLICATION

This is a Continuation Application of International Application No. PCT/JP2021/048842, filed on Dec. 28, 2021 which claims priority to International Application No. PCT/JP2020/049265, filed on Dec. 28, 2020. The contents of the aforementioned applications are incorporated herein by reference.

BACKGROUND

Field of the Invention

The present invention relates to a calcium fluoride polycrystalline substance, a production method of a calcium fluoride particle, a production method of a calcium fluoride polycrystalline substance, an optical element, an optical system, an interchangeable lens and an optical device.

Background

A production method for obtaining a calcium fluoride sintered body by hot pressing has been proposed (for example, Japanese Unexamined Patent Application, First Publication No. 2003-300777).

However, the transmittance of the sintered body is low compared with the transmittance of a single crystal, and there is a demand for increasing the transmittance in order to use the sintered body as an optical member.

SUMMARY

According to a first aspect, in a calcium fluoride polycrystalline substance, an internal transmittance of light having a wavelength of 550 nm per thickness of 10 mm is 98% or more.

According to a second aspect, a production method of a calcium fluoride particle has a generation step of generating a dispersion liquid containing calcium fluoride particles by reacting a calcium compound and a fluorine compound in a solution, a mixing step of mixing the calcium fluoride particles that are contained in the dispersion liquid and hydrofluoric acid, and a separation step of separating the calcium fluoride particles and the hydrofluoric acid after the mixing step.

According to a third aspect, a production method of a calcium fluoride polycrystalline substance includes a molding step of molding calcium fluoride particles produced by the production method of a calcium fluoride particle of the second aspect to form a compact and a sintering step of sintering the compact in an inert atmosphere to generate a polycrystalline substance.

According to a fourth aspect, in an optical element, the calcium fluoride polycrystalline substance of the first aspect is used.

According to a fifth aspect of the present invention, an optical system has the optical element of the fourth aspect.

According to a sixth aspect, an interchangeable lens includes the optical system of the fifth aspect.

According to a seventh aspect, an optical device includes the optical system of the fifth aspect.

BRIEF DESCRIPTION OF DRAWINGS

FIG. 7 shows conditions for the production of calcium fluoride particles of examples and the measurement results of the internal transmittances with respect to light having a wavelength of 550 nm and optical strains of calcium fluoride sintered bodies.

FIG. 8 shows conditions for the production of calcium fluoride particles of examples and the measurement results of the internal transmittances with respect to light having a wavelength of 550 nm and optical strains of calcium fluoride sintered bodies.

FIG. 13 is a view showing the measurement results of the spectral transmittances of the calcium fluoride sintered bodies in the examples.

FIG. 16 shows conditions for the production of calcium fluoride particles of an example and the measurement results of the internal transmittance with respect to light having a wavelength of 550 nm and optical strain of a calcium fluoride sintered body.

DESCRIPTION OF EMBODIMENTS

A calcium fluoride ($CaF_2$) sintered body, a production method of a calcium fluoride particle and a production method of a calcium fluoride sintered body according to an embodiment will be described with reference to drawings. The sintered body in the present specification refers to a polycrystalline substance.

In the calcium fluoride sintered body of the present embodiment, the internal transmittance of light having a wavelength of 550 nm per thickness of 10 mm is 98% or more. In the calcium fluoride sintered body of the present embodiment, the internal transmittance of light having a wavelength of 380 nm to 780 nm per thickness of 10 mm may be 90% or more. In addition, in the calcium fluoride sintered body of the present embodiment, the internal transmittance of light having a wavelength of 3 μm to 7 μm per thickness of 10 mm may be 90% or more. In addition, in the calcium fluoride sintered body of the present embodiment, in the infrared region, a wavelength $IR\lambda_{80}$ at which the internal transmittance per thickness of 10 mm becomes 80% or more may be 8 μm or longer. In addition, in the calcium fluoride sintered body of the present embodiment, the optical strain may be 25 nm/cm or less, may be 20 nm/cm or less and may be 10 nm/cm or less. In addition, in the calcium fluoride sintered body of the present embodiment, the relative density with respect to the density of a calcium fluoride single crystal may be 98% or higher.

The above-described production method of a calcium fluoride sintered body and the production method of a calcium fluoride particle, which serves as a material of the calcium fluoride sintered body, will be described with reference to FIG. 1.

In a step S1, a calcium compound (for example, high-purity calcium acetate hydrate, high-purity calcium carbonate, high-purity calcium nitrate or the like) is dissolved in distilled water, and a calcium compound aqueous solution is prepared. At this time, in a case where an organic salt such as calcium acetate is used, nitric acid is preferably added as an oxidant.

In a step S2, distilled water is added to high-purity hydrofluoric acid (hydrofluoric acid) to dilute the hydrofluoric acid to an appropriate concentration, and a fluorine compound aqueous solution is prepared. The fluorine compound aqueous solution may be prepared by using ammonium fluoride or the like instead of hydrofluoric acid and dissolving the ammonium fluoride in distilled water.

Figure 2:
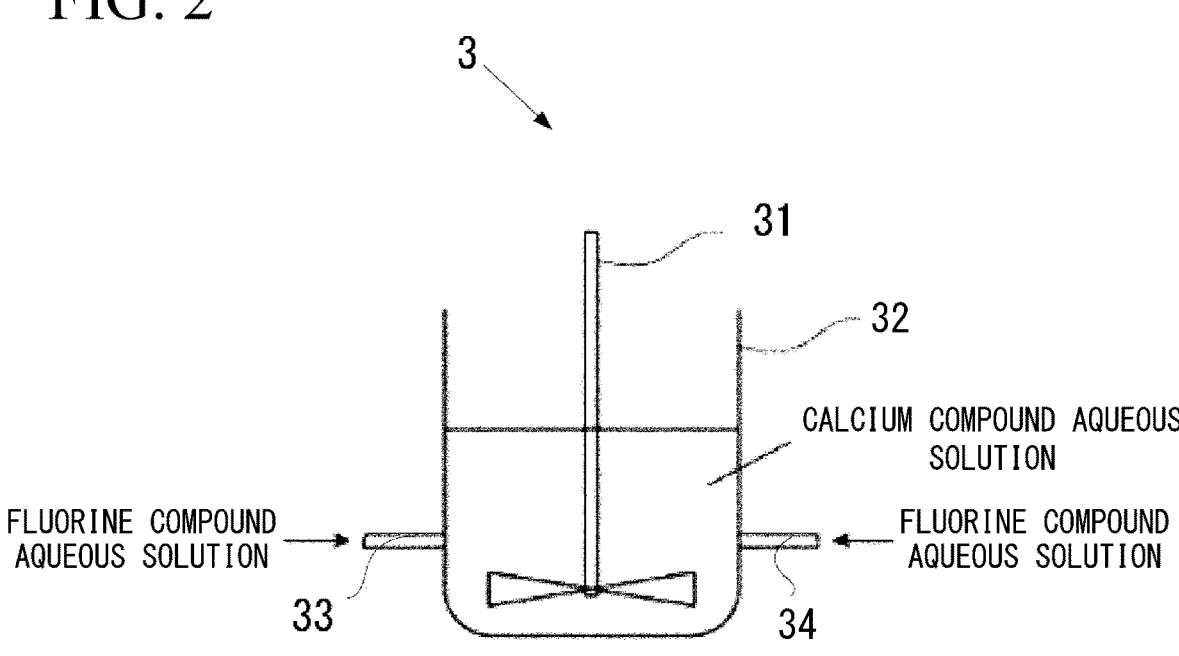
FIG. 2 is a view schematically showing an example of a stirring device that is used at the time of reacting a calcium compound aqueous solution and a fluorine compound aqueous solution.

In a step S3, the calcium compound aqueous solution and the fluorine compound aqueous solution are reacted (that is, the calcium compound and the fluorine compound are reacted in an aqueous solution) to generate a dispersion liquid containing calcium fluoride particles (generation step). Specifically, the fluorine compound aqueous solution is poured into the calcium compound aqueous solution in a mole ratio of 2.4 to 5.0 while the calcium compound aqueous solution is being stirred. In this case, the fluorine compound aqueous solution is slowly poured into the calcium compound aqueous solution under stirring by rotating a stirring bar 31 (blade diameter: 10 cm) in a stirring device 3 shown in FIG. 2 at 300 rpm. Inlets 33 and 34 for the fluorine compound aqueous solution are installed on the side surface of a plastic beaker 32 of the stirring device 3, and the fluorine compound aqueous solution is poured into the calcium compound aqueous solution from a container (not shown) in which the fluorine compound aqueous solution has been stored with a roller tube pump (not shown) over, for example, approximately one hour. Once the fluorine compound aqueous solution is fully poured into the calcium compound aqueous solution, the aqueous solutions are continuously stirred for, for example, two to six hours. This makes it possible to suppress the aggregation of calcium fluoride particles and generate calcium fluoride particles having small grain diameters. The stirring after the pouring of the fluorine compound aqueous solution is performed using, for example, a water bath in a state where the aqueous solutions are held at a temperature of 5° C. to 10° C. Stirring performed in a low-temperature state makes it possible to increase the transmittance of a calcium fluoride sintered body that is to be produced using the generated calcium fluoride particles.

In a step S4, the dispersion liquid containing the calcium fluoride particles is heated and pressurized at the same time, the reaction between the calcium compound and the fluorine compound is promoted, and the calcium fluoride particles are grown to be large to enhance crystallinity (heating and pressurization step). Specifically, the dispersion liquid containing the calcium fluoride particles (a dispersion liquid in which the fine calcium fluoride particles have been suspended (slurry)) is heated and pressurized for 10 hours or longer and 24 hours or shorter in a state of being held at a temperature of, for example, a heating temperature of 100° C. or higher and 180° C. or lower in a closed container (for example, an autoclave including a TEFLON (registered trademark) container). After the heating and pressurization step, once the temperature of the closed container drops to room temperature, a supernatant is absorbed and removed, and the calcium fluoride particles are left and separated. In a step S5, the separated calcium fluoride particles are mixed with, for example, 0.1% to 20% of hydrofluoric acid and stirred (mixing step).

In a step S6, a hydrofluoric acid liquid mixture of the calcium fluoride particles generated in the mixing step is transferred to a centrifuge tube, the centrifuge tube is put into a centrifuge, and the liquid mixture is separated into solid (calcium fluoride particles) and liquid (hydrofluoric acid) (separation step). In this case, the centrifugation is performed, for example, at a rotation speed of the centrifuge set to 1000 rpm for 10 minutes. After the solid and the liquid are separated, a supernatant is excluded, after that, distilled water is poured into the centrifuge tube where the calcium fluoride particles are left to sufficiently disperse the calcium fluoride particles. At this time, the calcium fluoride particles are dispersed using a shaking machine, whereby the inflow of a foreign matter from the outside can be prevented. After the liquid mixture is shaken with the shaking machine for approximately 30 minutes until a state where the calcium fluoride particles do not precipitate is formed, again, the liquid mixture is separated into solid and liquid with the centrifuge to remove a supernatant and, furthermore, distilled water is poured into the centrifuge tube to sufficiently disperse the calcium fluoride particles. The step of dispersing the calcium fluoride particles by adding distilled water and the step of separating the liquid mixture into solid and liquid with the centrifuge are repeated until the concentration of hydrofluoric acid in the supernatant reaches 200 ppm or lower. When the number of times of the pouring of the distilled water is small, the transmittance of a calcium fluoride sintered body that is to be produced using the generated calcium fluoride particles is low, and a number of approximately 0.1 mm white spots, which are clusters of fine bubbles, are observed in the sintered body. In addition, as the number of times of the pouring of the distilled water increases, aggregation of the calcium fluoride particles loosens, and the grain diameters become smaller, which makes the calcium fluoride particles less likely to precipitate. Therefore, the rotation speed of the centrifuge is slowly increased to, for example, 1000 rpm, 1200 rpm, 1400 rpm, 1600 rpm, 1800 rpm and 2000 rpm.

The separation step is not limited to the above-described method in which the shaking machine and the centrifuge are used. For example, the separation step may be performed with a well-known filtration device. Examples of the filtration device include a Nutsch-type filtration device and the like. In a case where the Nutsch-type filtration device is used, first, the hydrofluoric acid liquid mixture of the calcium fluoride particles generated in the mixing step is stirred while water is added to prepare a diluted slurry. Next, the diluted slurry is supplied to the Nutsch-type filtration device, and the diluted slurry is filtered under the application of pressure. At this time, the pressure is preferably applied while water is supplied. In a case where such a filtration device is used, the separation step can be performed within a shorter period of time than in a case where the shaking machine and the centrifuge are used.

The treatments of the above-described steps S1 to S6 are treatments in the production method of a calcium fluoride particle in the present embodiment.

In a step S7, among granules obtained by pulverizing a dried body (cake) composed of the calcium fluoride particles produced by the above-described production method of a calcium fluoride particle, calcium fluoride granules classified to have a predetermined particle diameter or smaller are molded to form a compact (molding step). Calcium fluoride granules are classified by storing the calcium fluoride particles produced by the above-described production method of a calcium fluoride particle in a TEFLON container, drying the calcium fluoride particles, for example, at 160° C. for approximately 10 hours, and then removing large granules using, for example, a 1 mm sieve.

As a molding method, for example, there are two methods to be described below.

In a first molding method, the classified calcium fluoride particles are pressed using a die having a predetermined shape to mold a compact.

In a second molding method, a slurry containing the calcium fluoride particles produced by the above-described production method of a calcium fluoride particle is stored in, for example, a dish-like container and dried at 70° C. to 300° C. for approximately 10 hours to mold a compact.

In a step S8, the compact molded by the above-described first molding method or second molding method (a compact having a relative density of 35% to 50%) is sintered to generate a sintered body (white sintered body) (sintering step). In the sintering step, the white compact is sintered, for example, at 400° C. to 700° C. for two to six hours (initial sintering), thereby generating a white sintered body having a relative density increased to approximately 40% to 70%. When the relative density of the compact before sintering is too high, the white sintered body does not become transparent in the post step. In addition, when the temperature during sintering is too high, the initial sintering progresses, the driving force of sintering in the post step is small, and an increase in the optical strain (that is, the deterioration of an optical characteristic) is caused. In addition, when the temperature during sintering is too low, an organic component remains in the sintered body, and a high transmittance cannot be obtained.

Next, the white sintered body is held in an inert atmosphere (for example, a vacuum, argon or a nitrogen atmosphere), for example, at 900° C. to 1000° C. for one to two hours, thereby obtaining a white sintered body having a relative density of approximately 98%.

In a step S9, the white sintered body is subjected to a heating and pressurization treatment with, for example, a hot isostatic pressing device (HIP) and made to be transparent, thereby generating a transparent sintered body (making-transparent step). Specifically, the white sintered body is heated to, for example, 1000° C. to 1100° C. in an inert atmosphere (for example, an argon atmosphere) in a state where a pressure of 100 MPa is held, whereby pores remaining in the white sintered body are pushed out to the outside, and a transparent sintered body (that is, the calcium fluoride sintered body of the present embodiment) is produced. That is, the treatments of the above-described steps S7 to S9 are treatments in the production method of a calcium fluoride sintered body in the present embodiment.

After the making-transparent step, an annealing step of annealing the transparent sintered body may be provided as necessary. The transparent sintered body is annealed, for example, in an inert atmosphere for a heating time of 40 hours or longer in a temperature range of 600° C. or higher and 800° C. or lower. This makes it possible to further reduce the optical strain of the transparent sintered body and to make the optical strain, for example, 2 nm/cm or less.

An embodiment of an image capturing device including an optical element composed of the calcium fluoride sintered body produced as described above will be described.

Figure 3:
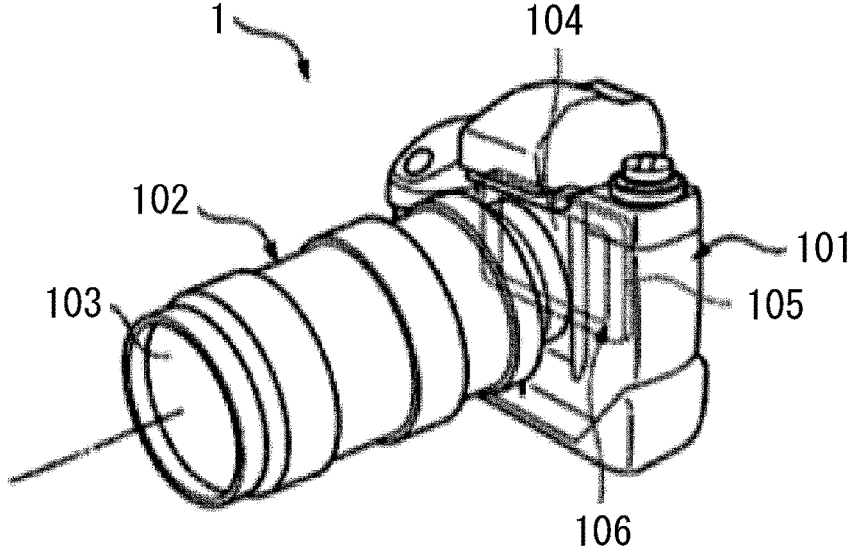
FIG. 3 is a perspective view showing an example of an image capturing device according to an embodiment.

FIG. 3 is a perspective view of the image capturing device of the present embodiment. An image capturing device 1 is a so-called digital single-lens reflex camera (lens interchangeable camera), and an image capturing lens 103 (optical system) includes an optical element made of the calcium fluoride sintered body according to the present embodiment as a base material. A lens barrel 102 is detachably installed in a lens mount (not shown) of a camera body 101. Light that has passed through the image capturing lens 103 of the lens barrel 102 forms an image on a sensor chip (solid image capturing element) 104 of a multichip module 106 disposed on the rear surface of the camera body 101. This sensor chip 104 is a bare chip such as a so-called CMOS image sensor, and the multichip module 106 is, for example, a chip on glass-type (COG type) module in which the sensor chip 104 is bare-chip-mounted on a glass substrate 105.

Figure 4:
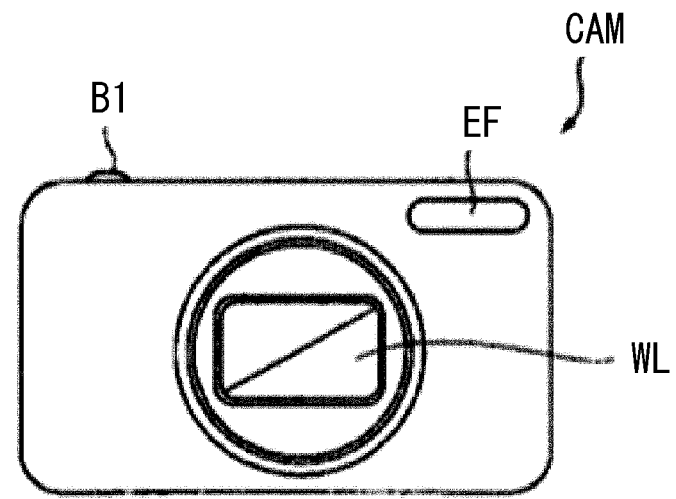
FIG. 4 is a front view showing another example of the image capturing device according to the embodiment.
Figure 5:
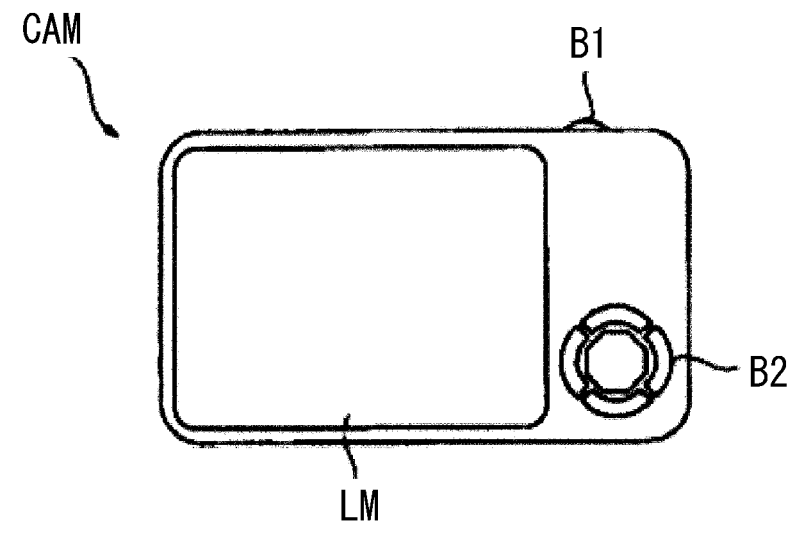
FIG. 5 is a rear view showing the other example of the image capturing device according to the embodiment.

FIG. 4 is a front view of another example of the image capturing device including an optical element composed of the calcium fluoride sintered body according to the present embodiment, and FIG. 5 is a rear view of the image capturing device of FIG. 4.

This image capturing device CAM is a so-called digital still camera (lens non-interchangeable camera), and an image capturing lens WL (optical system) includes an optical element made of the calcium fluoride sintered body according to the present embodiment as a base material. In the image capturing device CAM, when a power supply button, not shown, is pressed, a shutter (not shown) of the image capturing lens WL is opened, light from a subject (object) is condensed with the image capturing lens WL, and an image is formed on an image capturing element disposed on an image surface. The image of the subject formed on the image capturing element is displayed on a liquid crystal monitor LM disposed behind the image capturing device CAM. An image capturing person determines the composition of the image of the subject while seeing the liquid crystal monitor LM, then, presses a release button B1 to capture the image of the subject with the image capturing element, and records and saves the image in a memory (not shown).

In the image capturing device CAM, a fill light-emitting portion EF that emits fill light in a case where the subject is dark, a function button B2 that is used for the setting and the like of a variety of conditions for the image capturing device CAM and the like are disposed. For optical systems that are used in such digital cameras and the like, a higher resolution, weight reduction and size reduction are required. In order to realize these, it is effective to use glass having a high refractive index for the optical systems. Particularly, there is a high demand for glass having a high refractive index, a low specific gravity ($S_g$) and high press moldability. From such viewpoints, the calcium fluoride sintered body of the present embodiment is suitable as a member for optical equipment.

Optical equipment that is applicable in the present embodiment is not limited to the above-described image capturing devices, and examples thereof include projectors and the like. The optical element is also not limited to lenses, and examples thereof include prisms and the like.

Next, a multiphoton microscope including an optical element for which the calcium fluoride sintered body of the present embodiment is used will be described.

Figure 6:
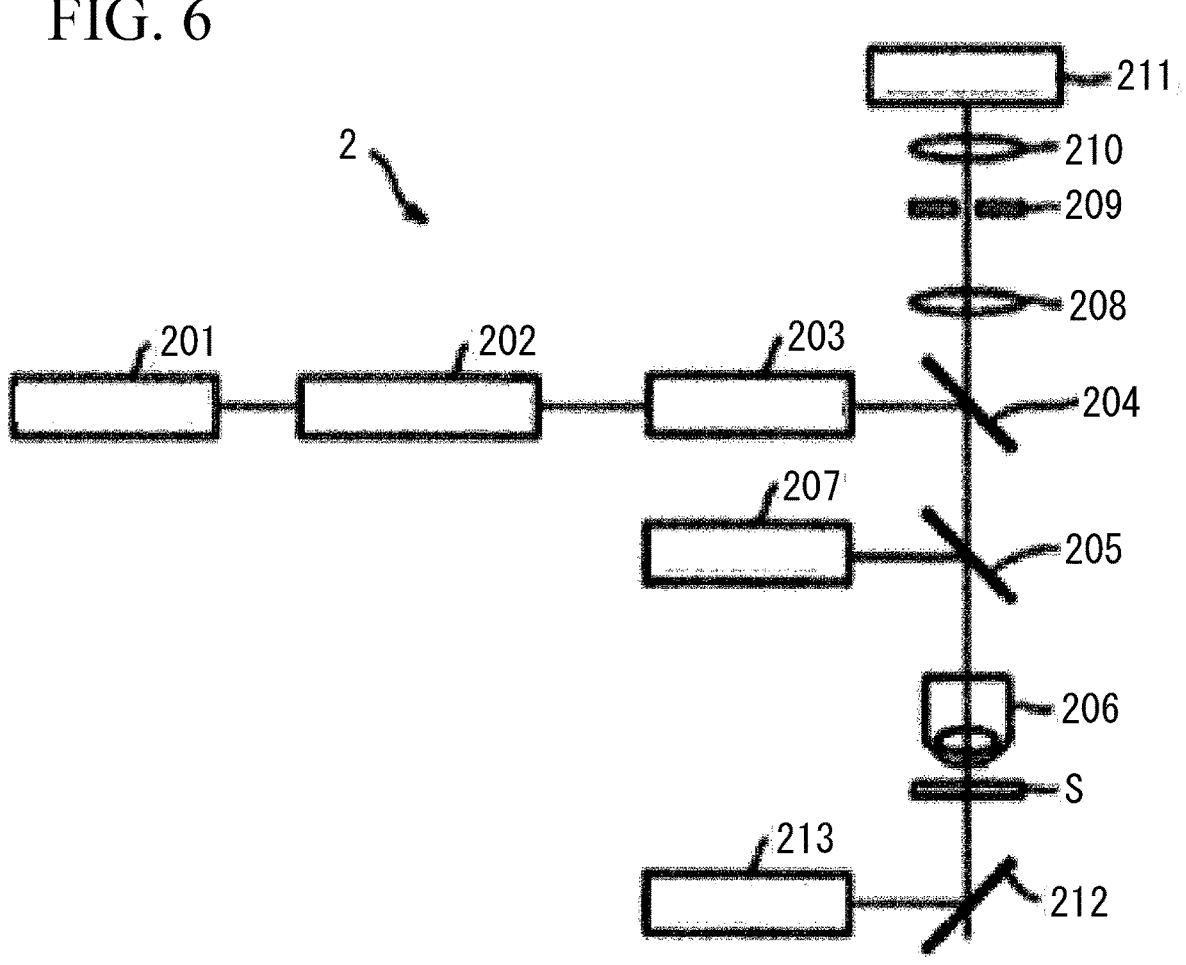
FIG. 6 is a block diagram showing an example of a multiphoton microscope according to an embodiment.

FIG. 6 is a block diagram showing an example of the configuration of a multiphoton microscope 2 of the present embodiment. The multiphoton microscope 2 includes an objective lens 206, a condenser lens 208 and an imaging lens 210. At least one of the objective lens 206, the condenser lens 208 and the imaging lens 210 includes an optical element made of the calcium fluoride sintered body according to the present embodiment as a base material. Hereinafter, an optical system of the multiphoton microscope 2 will be mainly described.

A pulse laser device 201 discharges, for example, ultrashort pulse light that is a near-infrared ray (approximately 1000 nm) and has a pulse width in the femtosecond unit (for example, 100 femtoseconds). The ultrashort pulse light immediately after being discharged from the pulse laser device 201 is generally linearly polarized light having a vibration direction of an electric field in a predetermined direction. A pulse separation device 202 splits the ultrashort pulse light, increases the repetition frequency of the ultrashort pulse light and discharges the ultrashort pulse light.

A beam adjustment portion 203 has a function of adjusting the beam diameter of the ultrashort pulse light that is incident from the pulse split device 202 according to the pupil diameter of the objective lens 206, a function of adjusting the condensation and divergence angle of the ultrashort pulse light in order to correct the axial chromatic aberration (focus difference) between the wavelength of multiphoton excitation light that is discharged from a sample S and the wavelength of the ultrashort pulse light and a pre-chirping function of imparting an inverse group velocity dispersion to the ultrashort pulse light in order to correct the spreading of the pulse width of the ultrashort pulse light while passing through the optical system due to the group velocity dispersion (group velocity dispersion compensation function).

For the ultrashort pulse light discharged from the pulse laser device 201, the repetition frequency is made to be large with the pulse split device 202, and the above-described adjustments are performed with the beam adjustment portion 203. The ultrashort pulse light discharged from the beam adjustment portion 203 is reflected in a direction toward a dichroic mirror 205 by a dichroic mirror 204, passes through the dichroic mirror 205, is condensed with the objective lens 206 and is radiated to the sample S. At this time, the ultrashort pulse light may be scanned on the observation surface of the sample S using scanning means (not shown).

For example, in the case of the fluorescence observation of the sample S, multiphoton excitation of a fluorescent dye that dyes the sample S occurs in a region of the sample S irradiated with the ultrashort pulse light and a vicinity thereof, and fluorescence having a shorter wavelength than the ultrashort pulse light having an infrared wavelength (hereinafter, referred to as observation light) is emitted. The observation light emitted from the sample S in a direction toward the objective lens 206 is collimated with the objective lens 206 and is reflected by the dichroic mirror 205 or passes through the dichroic mirror 205 depending on the wavelength thereof.

The observation light reflected by the dichroic mirror 205 is incident on a fluorescence detection portion 207. The fluorescence detection portion 207 is composed of, for example, a barrier filter, a photomultiplier tube (PMT) and the like, receives the observation light reflected by the dichroic mirror 205 and outputs an electrical signal according to the light intensity thereof. In addition, the fluorescence detection portion 207 detects the observation light across the observed section of the sample S in association with the scanning of the ultrashort pulse light on the observed section of the sample S.

All observation light emitted from the sample S in the direction toward the objective lens 206 may be detected with a fluorescence detection portion 211 by deviating the dichroic mirror 205 from the light path.

In this case, the observation light is de-scanned with the scanning means (not shown), is transmitted through the dichroic mirror 204, is condensed with the condenser lens 208, passes through a pinhole 209 that is provided at a position that is almost conjugate to the focal position of the objective lens 206, is transmitted through the imaging lens 210 and is incident on the fluorescence detection portion 211. The fluorescence detection portion 211 is composed of, for example, a barrier filter, a PMT and the like, receives the observation light that has formed an image on the light receiving surface of the fluorescence detection portion 211 with the imaging lens 210 and outputs an electrical signal according to the light intensity thereof. In addition, the fluorescence detection portion 211 detects the observation light across the observed section S of the sample S in association with the scanning of the ultrashort pulse light on the observed section of the sample S.

In addition, the observation light emitted in a direction opposite to the objective lens 206 from the sample S is reflected by a dichroic mirror 212 and incident on a fluorescence detection portion 213. The fluorescence detection portion 213 is composed of, for example, a barrier filter, a PMT and the like, receives the observation light reflected by the dichroic mirror 212 and outputs an electrical signal according to the light intensity thereof. In addition, the fluorescence detection portion 213 detects the observation light across the observed section of the sample S in association with the scanning of the ultrashort pulse light on the observed section of the sample S.

The electrical signal output from each of the fluorescence detection portions 207, 211 and 213 is input to, for example, a computer (not shown). The computer is capable of generating an observation image based on the input electrical signal and displaying the generated observation image or storing the data of the observation image.

According to the above-described embodiment, the following action effects can be obtained.

(1) The production method of a calcium fluoride particle includes a generation step of generating a dispersion liquid containing calcium fluoride particles by reacting a calcium compound and a fluorine compound in a solution, a mixing step of mixing the calcium fluoride particles that are contained in the dispersion liquid and hydrofluoric acid, and a separation step of separating the calcium fluoride particles and the liquid component after the mixing step. This makes it possible to produce calcium fluoride particles that can be used to produce a calcium fluoride sintered body having a high transmittance.

(2) The concentration of hydrogen fluoride in a hydrofluoric acid aqueous solution that is used in the mixing step is 0.1% or higher and 20% or lower. This makes it possible to suppress the generation of approximately 0.1 mm white spots, which are clusters of fine bubbles, in a sintered body that is obtained by sintering calcium fluoride particles to be produced.

(3) The production method of a calcium fluoride sintered body includes a molding step of molding calcium fluoride particles produced by the production method of a calcium fluoride particle to form a compact and a sintering step of sintering the compact in an inert atmosphere to generate a sintered body. This makes it possible to produce a calcium fluoride sintered body having a high transmittance.

(4) In the molding step, the calcium fluoride particles having a predetermined particle diameter or smaller are molded to form the compact. This makes it possible to obtain a compact of calcium fluoride particles that is used to produce a calcium fluoride sintered body having a high transmittance.

(5) In the production method of a calcium fluoride sintered body, in the sintering step, the compact having a relative density of 35% or higher and 50% or lower is sintered at 400° C. or higher and 700° C. or lower for two hours or longer and six hours or shorter (initial sintering) and then sintered at 900° C. or higher and 1000° C. or lower in an inert atmosphere for one hour or longer and two hours or shorter. The initial sintering performed at 400° C. or higher and 700° C. or lower makes it possible to prevent a decrease in the driving force of sintering in the post step and an increase (deterioration) in the optical strain during grain growth, which occur in a case where the compact is sintered in a state where the temperature is too high, and to suppress the remaining of an organic component in a raw material and a decrease in the transmittance due to the temperature being too low.

(6) The production method of a calcium fluoride sintered body further has a making-transparent step of making the sintered body transparent by heating the sintered body to 1000° C. or higher and 1100° C. or lower under application of a pressure of 100 MPa in an inert atmosphere after the sintering step. This makes it possible to obtain a transparent calcium fluoride sintered body.

Examples of the calcium fluoride sintered body of the above-described embodiment will be described.

EXAMPLES

Figure 1:
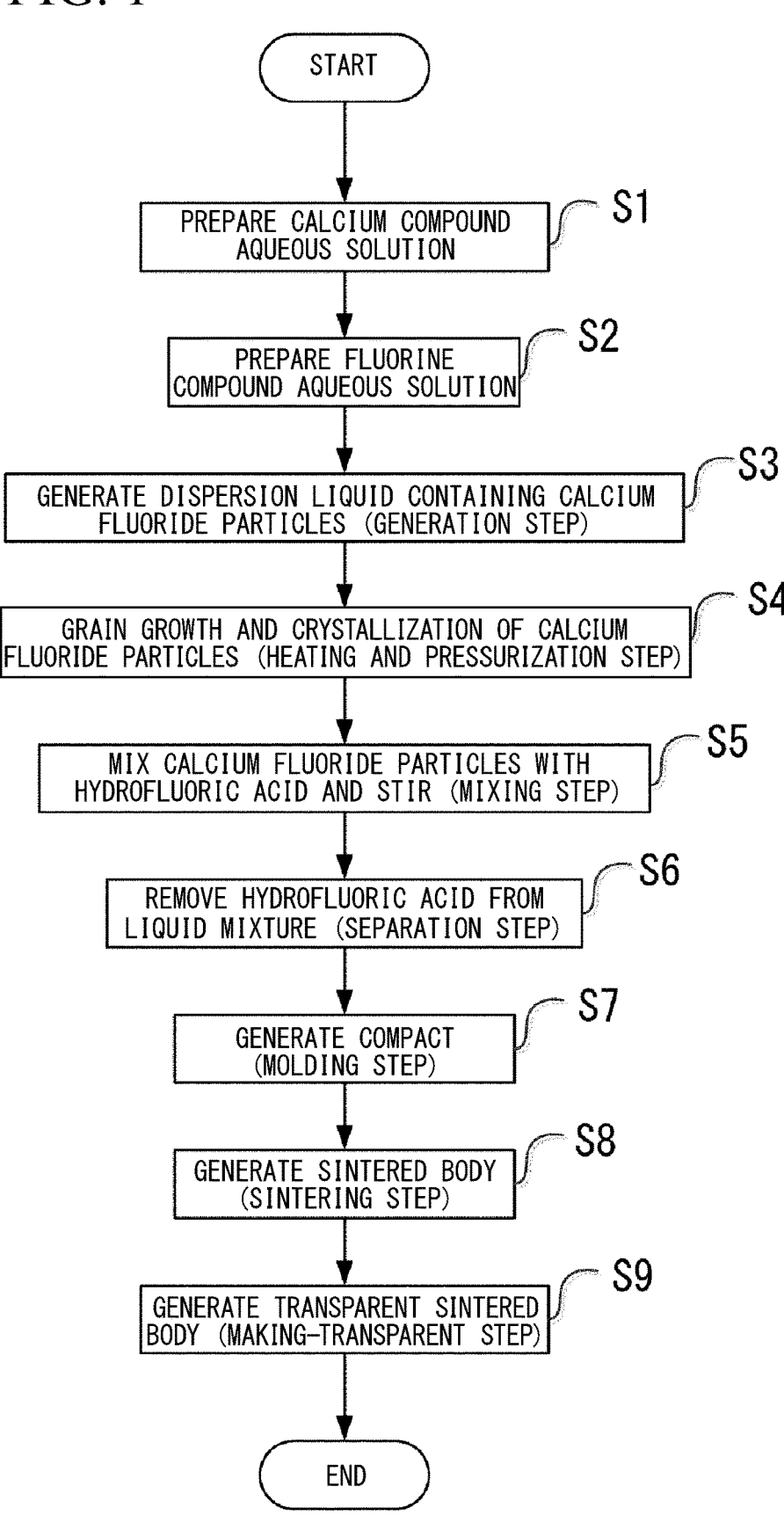
FIG. 1 is a flowchart showing a production method of a calcium fluoride sintered body according to an embodiment.

Calcium fluoride sintered bodies in the examples were produced according to treatments shown in a flowchart of FIG. 1. In the examples, calcium acetate hydrate was used as a calcium compound, and hydrofluoric acid was used as a fluorine compound.

In the examples, 20 calcium fluoride sintered body (transparent sintered body) samples were prepared by altering conditions for the production of calcium fluoride particles and sintering, and the internal transmittance of light having a wavelength of 550 nm and the optical strain were measured from each sample having both surfaces polished. The optical strains were measured using FULLAUTO STRAIN-EYE LSM-9000s (manufactured by Luceo Co., Ltd.).

FIG. 7 shows the conditions for the production of calcium fluoride particles used and sintering and the measurement results of the internal transmittances of light having a wavelength of 550 nm and optical strains of the calcium fluoride sintered bodies regarding samples 1 to 12 of the calcium fluoride sintered bodies of the examples. FIG. 8 shows the conditions for the production of calcium fluoride particles used and sintering and the measurement results of the internal transmittances of light having a wavelength of 550 nm and optical strains of the calcium fluoride sintered bodies regarding samples 13 to 24 of the calcium fluoride sintered bodies of the examples. In FIG. 7 and FIG. 8, "transmittance" is the internal transmittance of light having a wavelength of 550 nm per thickness of 10 mm of the sample, in other words, the internal transmittance per distance of 10 mm that light actually traveled in the sample. "F/Ca ratio" is the mole ratio of a fluorine compound aqueous solution (hydrofluoric acid) that was poured into a calcium acetate aqueous solution to a calcium compound aqueous solution (calcium acetate aqueous solution) in a generation step of a step S3 in FIG. 1. "Hydrofluoric acid concentration" is the concentration of hydrofluoric acid with which the calcium fluoride particles were mixed in a mixing step of a step S5 in FIG. 1. "Hydrothermal temperature" is a temperature at which the grain growth and crystallization of the calcium fluoride particles were performed in a heating and pressurization step of a step S4 in FIG. 1. "Number of times of water washing" is the number of repetitions of a step in which the calcium fluoride particles and distilled water were mixed, stirred and separated into solid and liquid and a supernatant was removed in a step S6 in FIG. 1. "Drying temperature" is a sintering temperature when a compact was sintered to generate a white sintered body having a relative density of approximately 40% to 70% in a sintering step of a step S8 in FIG. 1. "Inert atmosphere sintering temperature" is a sintering temperature when a white sintered body having a relative density of 98% was generated in the sintering step of the step S8 in FIG. 1. "HIP temperature" is a heating temperature when a HIP treatment was performed in a "making-transparent step" of a step S9 in FIG. 1.

As shown in FIG. 7 and FIG. 8, in the calcium fluoride sintered bodies of the samples 1 to 24 in the examples, the internal transmittances of light having a wavelength of 550 nm were 98% or more. Furthermore, in the calcium fluoride sintered bodies of the samples 1 to 22, the optical strains were 10 nm/cm or less.

Figure 9A:
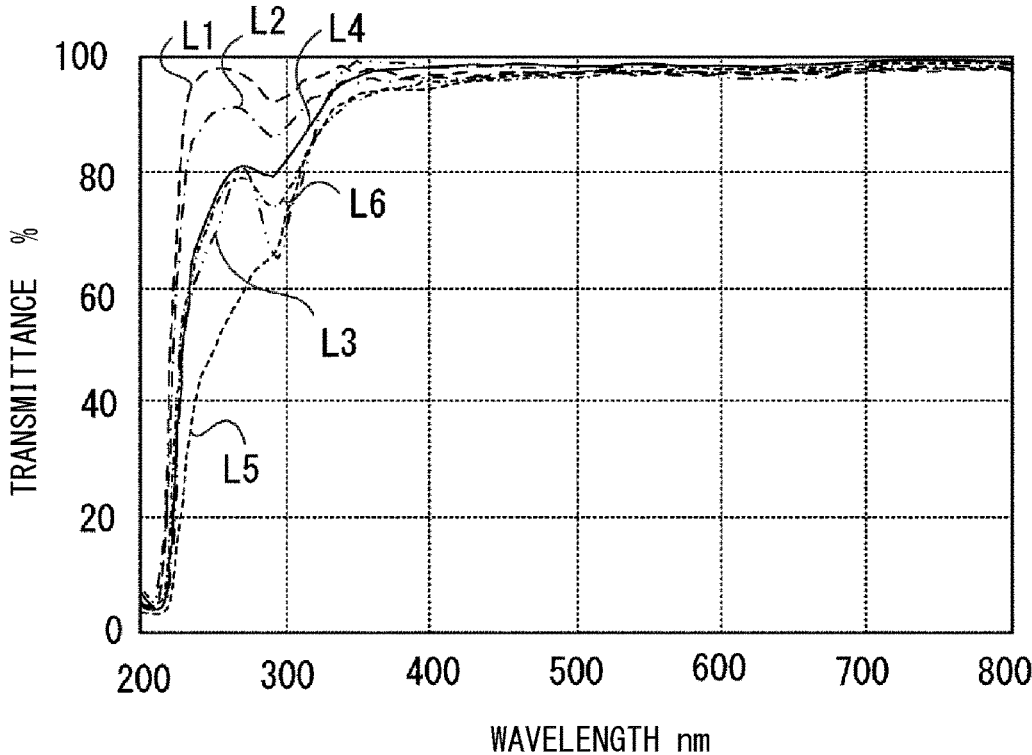
FIG. 9A is a view showing the measurement results of the spectral transmittances of the calcium fluoride sintered bodies in the examples.
Figure 9B:
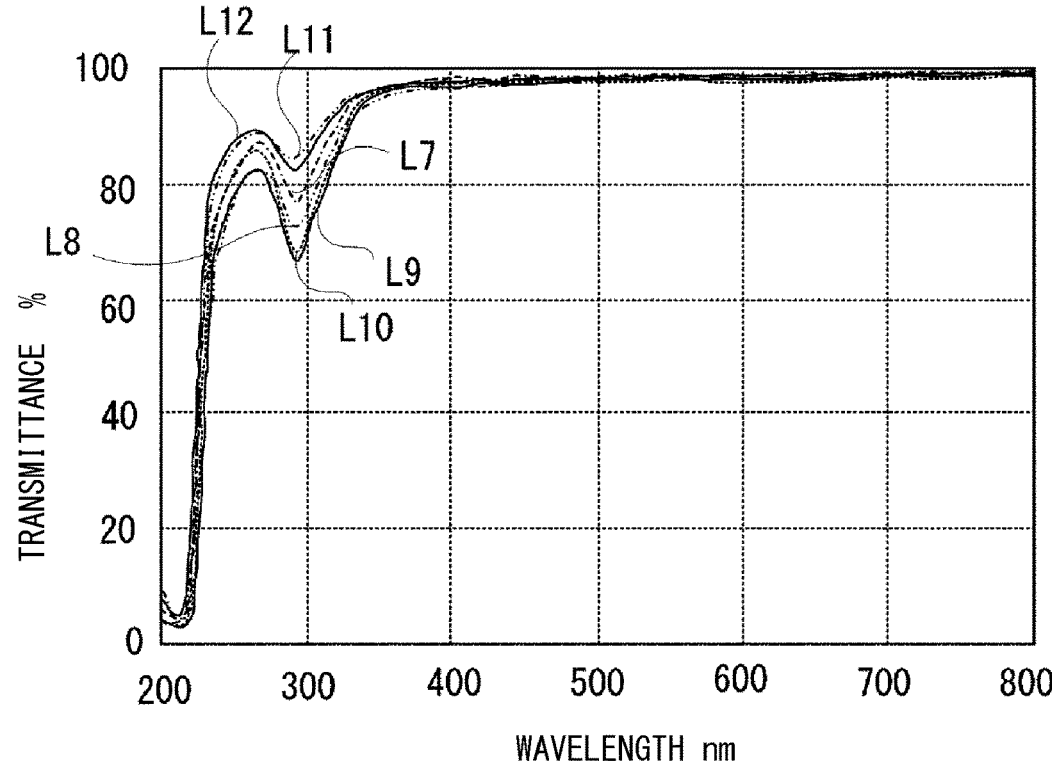
FIG. 9B is a view showing the measurement results of the spectral transmittances of the calcium fluoride sintered bodies in the examples.
Figure 10A:
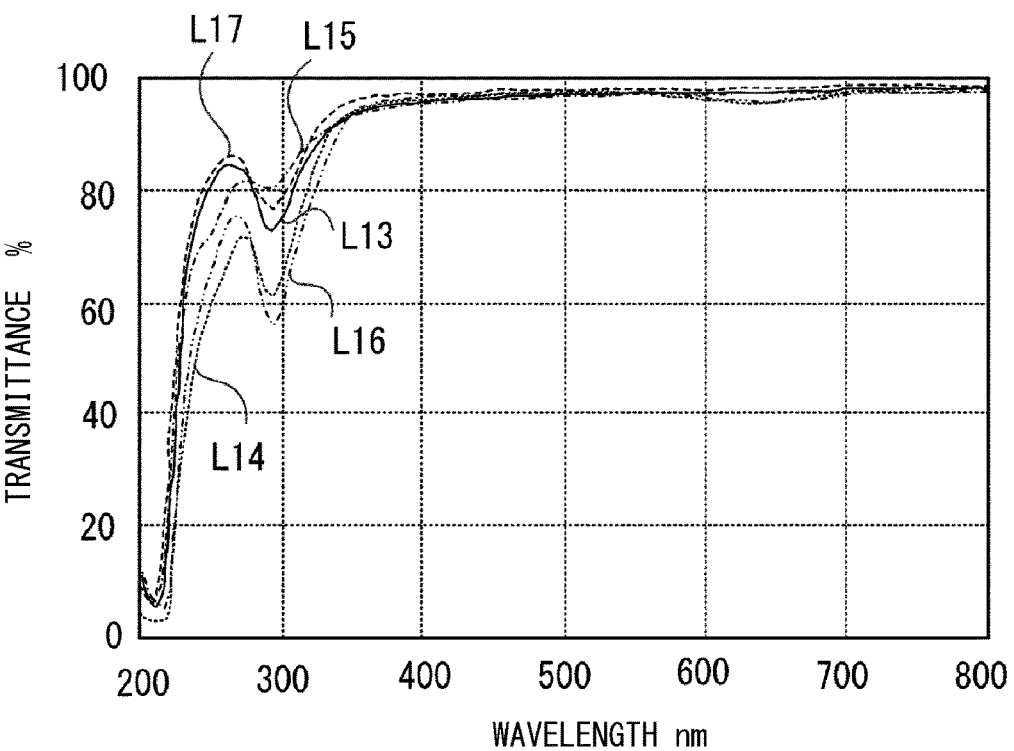
FIG. 10A is a view showing the measurement results of the spectral transmittances of the calcium fluoride sintered bodies in the examples.
Figure 10B:
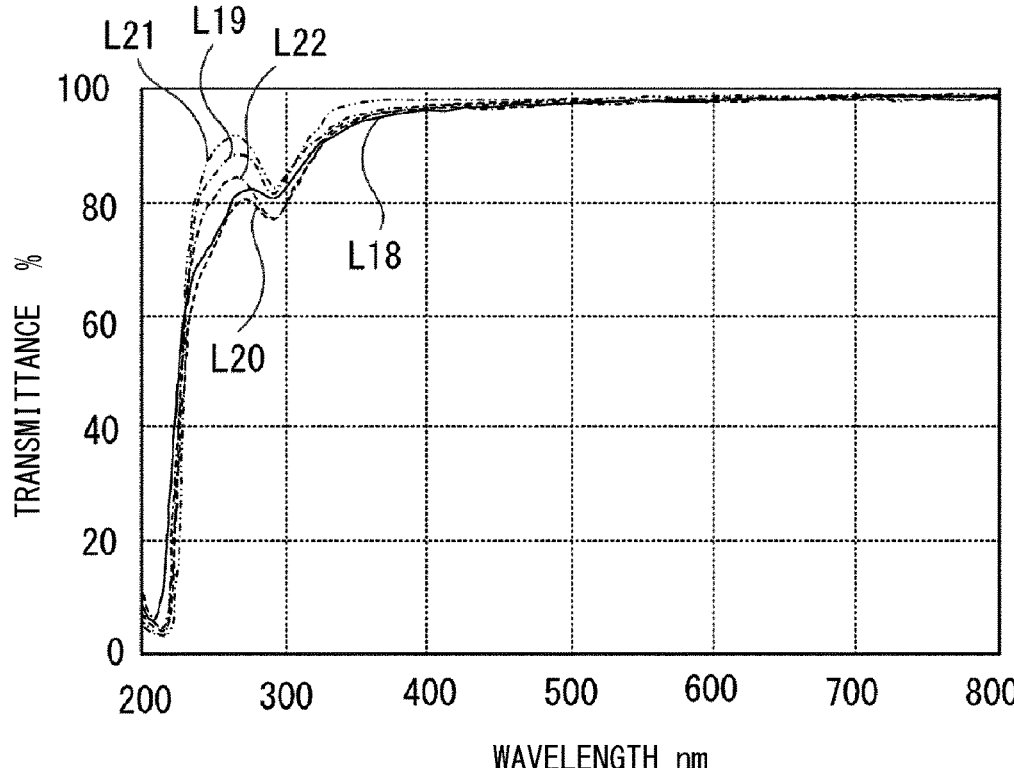
FIG. 10B is a view showing the measurement results of the spectral transmittances of the calcium fluoride sintered bodies in the examples.

FIGS. 9A and 9B to FIG. 13 are views showing the measurement results of the spectral transmittances of the calcium fluoride sintered bodies of the samples 1 to 24. The transmittances shown in FIGS. 9A and 9B to FIG. 13 are all the internal transmittances per thickness of 10 mm of the samples. In other words, the transmittances are the internal transmittances per distance of 10 mm that light actually traveled in the samples. In FIG. 9A, the measurement results of the spectral transmittances of light having wavelengths of 200 nm to 800 nm of the samples 1 to 6 are indicated by L1 to L6, and, in FIG. 9B, the measurement results of the spectral transmittances of light having wavelengths of 200 nm to 800 nm of the samples 7 to 12 are indicated by L7 to L12. In FIG. 10A, the measurement results of the spectral transmittances of light having wavelengths of 200 nm to 800 nm of the samples 13 to 17 are indicated by L13 to L17, and, in FIG. 10B, the measurement results of the spectral transmittances of light having wavelengths of 200 nm to 800 nm of the samples 18 to 22 are indicated by L18 to L22.

Figure 11A:
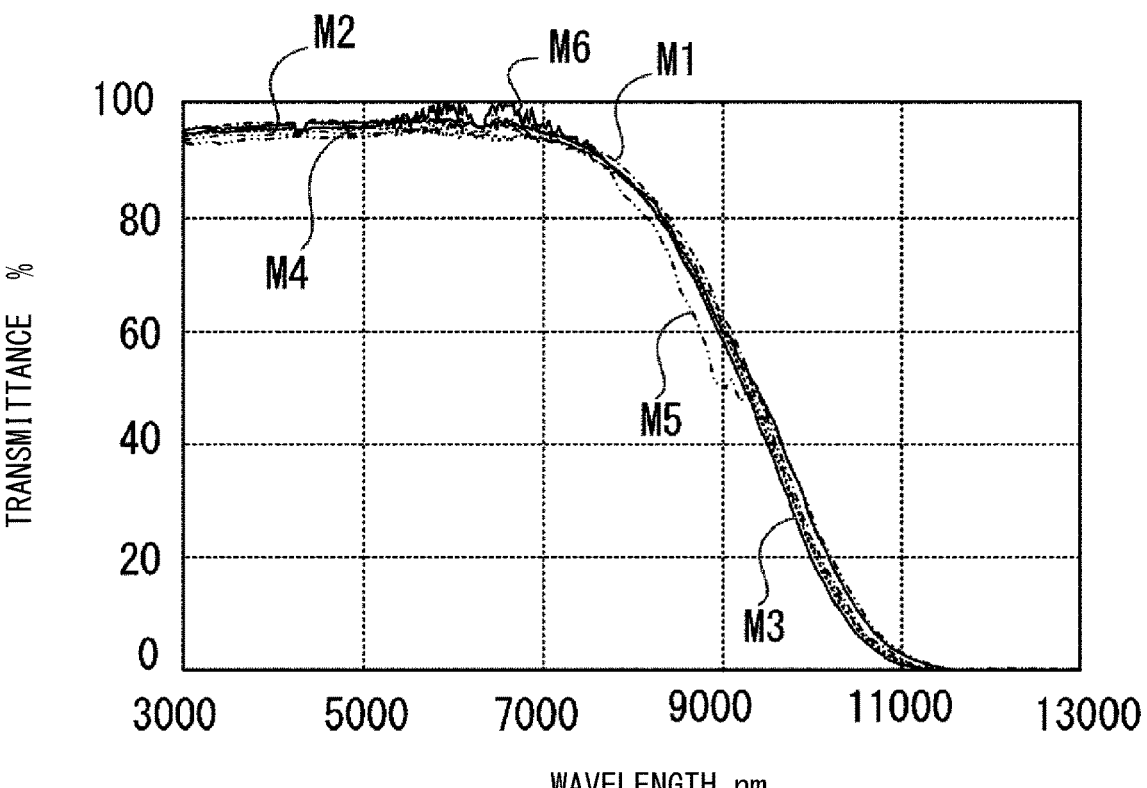
FIG. 11A is a view showing the measurement results of the spectral transmittances of the calcium fluoride sintered bodies in the examples.
Figure 11B:
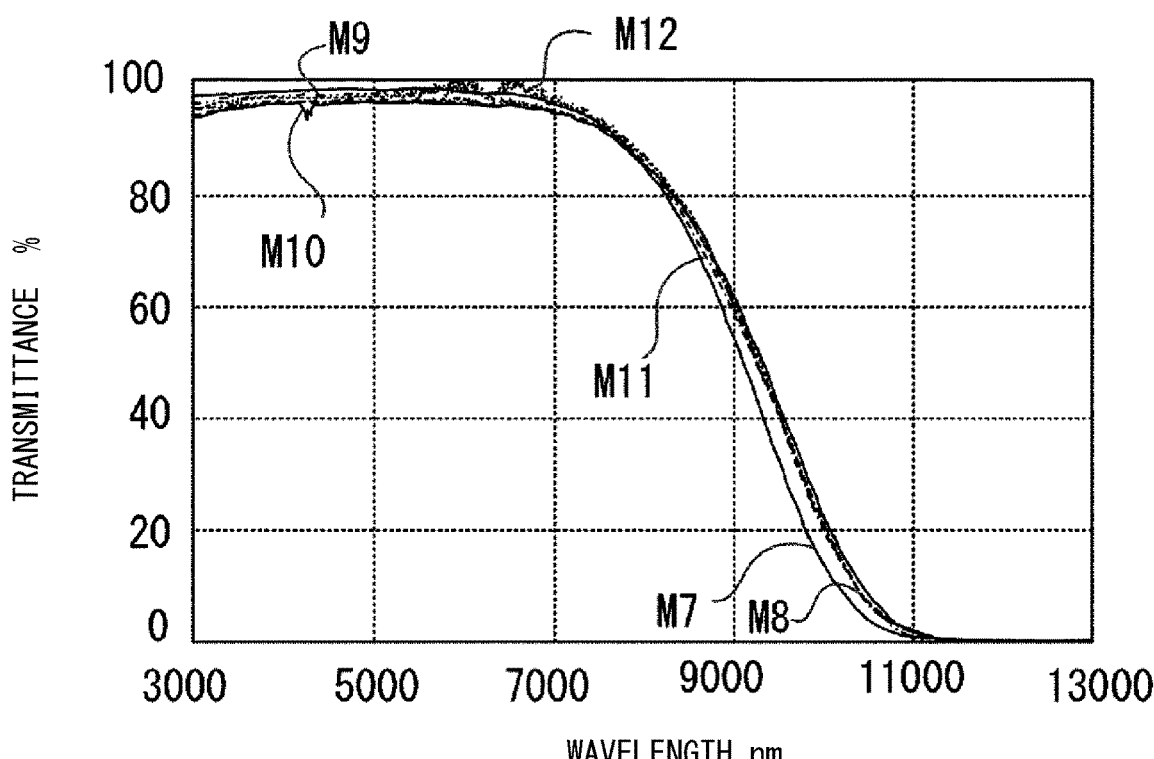
FIG. 11B is a view showing the measurement results of the spectral transmittances of the calcium fluoride sintered bodies in the examples.
Figure 12A:
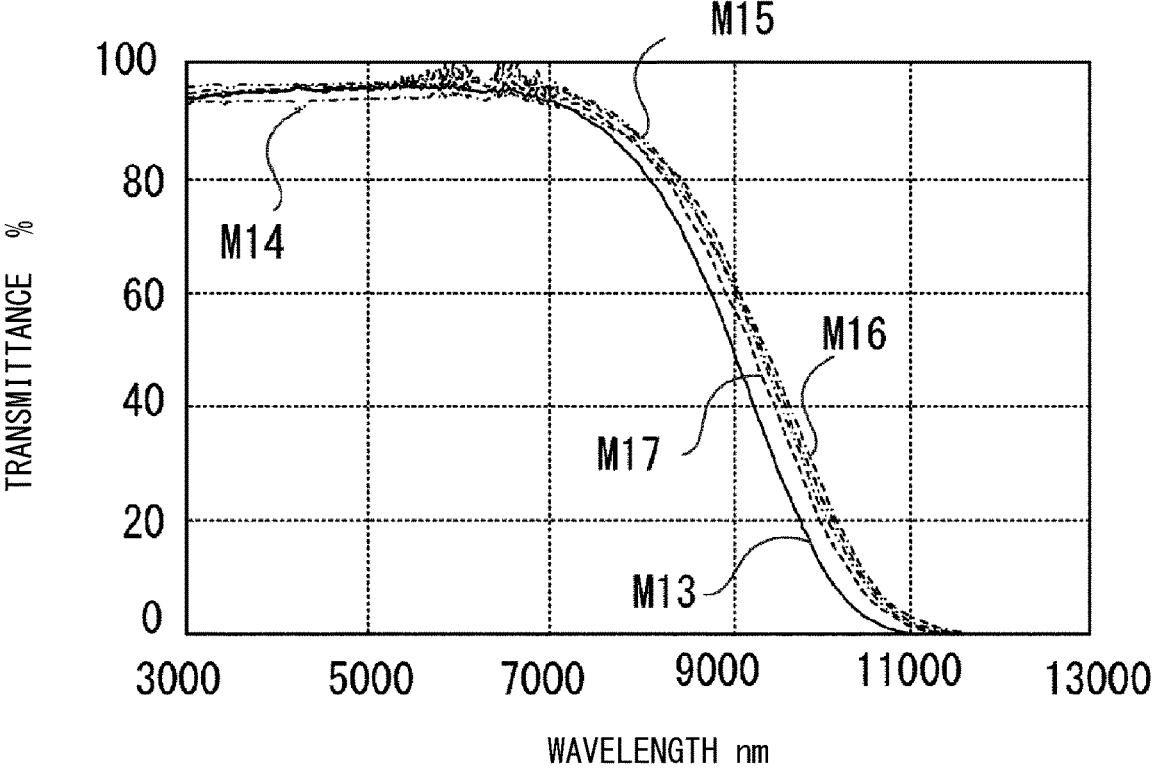
FIG. 12A is a view showing the measurement results of the spectral transmittances of the calcium fluoride sintered bodies in the examples.
Figure 12B:
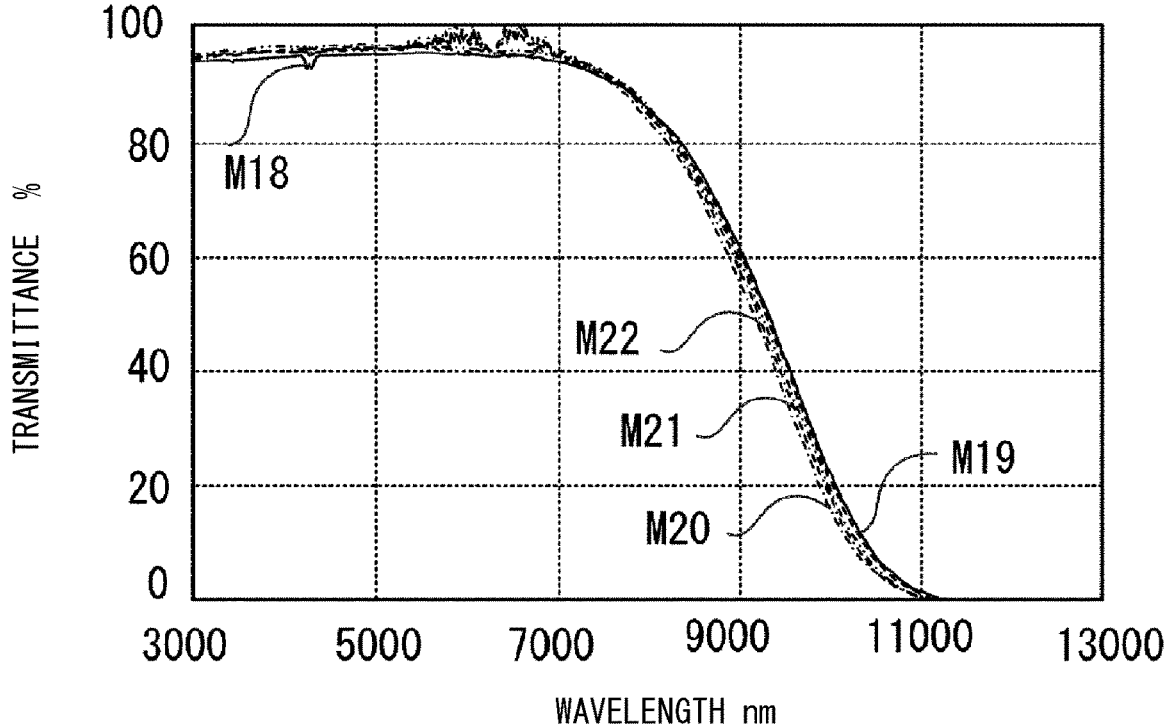
FIG. 12B is a view showing the measurement results of the spectral transmittances of the calcium fluoride sintered bodies in the examples.
Figure 13:
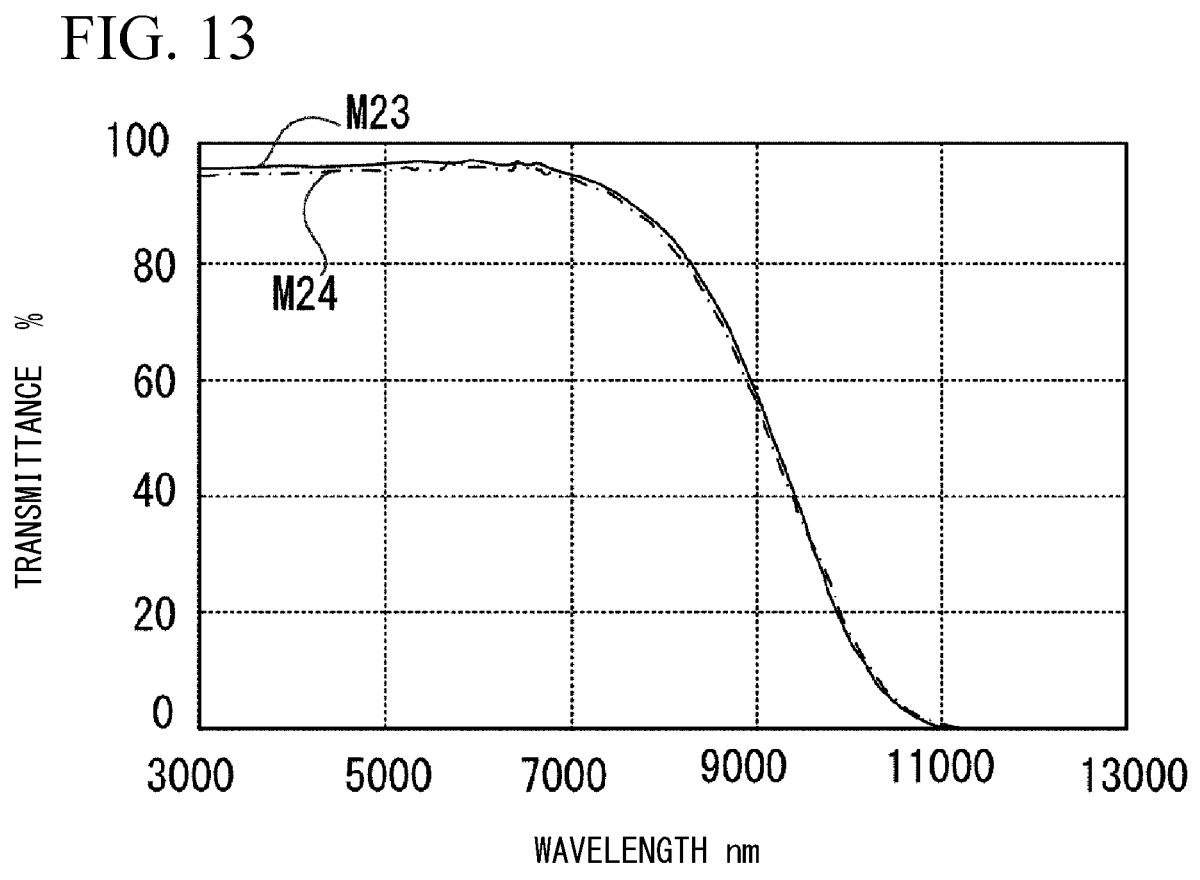

In FIG. 11A, the measurement results of the spectral transmittances of light having wavelengths of 3000 nm (3 $\mu$m) to 13000 nm (13 $\mu$m) of the samples 1 to 6 are indicated by M1 to M6, and, in FIG. 11B, the measurement results of the spectral transmittances of light having wavelengths of 3000 nm (3 $\mu$m) to 13000 nm (13 $\mu$m) of the samples 7 to 12 are indicated by M7 to M12. In FIG. 12A, the measurement results of the spectral transmittances of light having wavelengths of 3000 nm (3 $\mu$m) to 13000 nm (13 $\mu$m) of the samples 13 to 17 are indicated by M13 to M17, and, in FIG. 12B, the measurement results of the spectral transmittances of light having wavelengths of 3000 nm (3 $\mu$m) to 13000 nm (13 $\mu$m) of the samples 18 to 22 are indicated by M18 to M22. In FIG. 13, the measurement results of the spectral transmittances of light having wavelengths of 3000 nm (3 $\mu$m) to 13000 nm (13 $\mu$m) of the samples 23 and 24 are indicated by M23 and M24. As shown in FIGS. 9A and 9B and FIGS. 10A and 10B, in the calcium fluoride sintered bodies of the examples, the internal transmittances of light having wavelengths of 380 nm to 780 nm are 90% or more. As shown in FIGS. 11A and 11B, FIGS. 12A and 12B and FIG. 13, regarding the internal transmittances of the calcium fluoride sintered bodies of the examples, the internal transmittances of light having wavelengths of 3000 nm (3 $\mu$m) to 7000 nm (7 $\mu$m) are 90% or more. Furthermore, as shown in FIGS. 11A and 11B, FIGS. 12A and 12B and FIG. 13, in the infrared region, wavelengths IR$\lambda_{80}$ at which the internal transmittance of the calcium fluoride sintered body became 80% or more are 8000 nm (8 $\mu$m) or longer.

In addition, on the calcium fluoride sintered bodies of the samples 23 and 24, an annealing step was performed under conditions of a starting temperature of 800° C., a cooling rate of 5° C./h and an end temperature of 600° C. As a result, the optical strains of the calcium fluoride sintered bodies of the samples 23 and 24 were each 1.5 nm/cm.

In the above-described samples 1 to 24, the calcium fluoride sintered bodies were produced using calcium acetate hydrate as the calcium compound that was a raw material, but a calcium fluoride sintered body was produced using calcium nitrate as the calcium compound and prepared as a sample 25. FIG. 16 shows the conditions for the production of calcium fluoride particles used and sintering and the measurement results of the internal transmittance of light having a wavelength of 550 nm and optical strain of the calcium fluoride sintered body regarding the calcium fluoride sintered body of the sample 25. In FIG. 16, "transmittance" is the internal transmittance of light having a wavelength of 550 nm per thickness of 10 mm of the sample, in other words, the internal transmittance per distance of 10 mm that light actually traveled in the sample. "F/Ca ratio" is the mole ratio of a fluorine compound aqueous solution (hydrofluoric acid) that was poured into a calcium carbonate aqueous solution to a calcium compound aqueous solution (calcium carbonate aqueous solution) in the generation step of the step S3 in FIG. 1. "Hydrofluoric acid concentration" is the concentration of hydrofluoric acid with which the calcium fluoride particles were mixed in the mixing step of the step S5 in FIG. 1. "Hydrothermal temperature" is a temperature at which the grain growth and crystallization of the calcium fluoride particles were performed in the heating and pressurization step of the step S4 in FIG. 1. "Number of times of water washing" is the number of repetitions of a step in which the calcium fluoride particles and distilled water were mixed, stirred and separated into solid and liquid and a supernatant was removed in the step S6 in FIG. 1. "Drying temperature" is a sintering temperature when a compact was sintered to generate a white sintered body having a relative density of approximately 40% to 70% in the sintering step of the step S8 in FIG. 1. "Inert atmosphere sintering temperature" is a sintering temperature when a white sintered body having a relative density of 98% was generated in the sintering step of the step S8 in FIG. 1. "HIP temperature" is a heating temperature when a HIP treatment was performed in the "making-transparent step" of the step S9 in FIG. 1.

As shown in FIG. 16, in the calcium fluoride sintered body of the sample 25, the internal transmittance of light having a wavelength of 550 nm was 98% or more. Furthermore, in the calcium fluoride sintered body of the sample 25, the optical strain was 25 nm/cm or less.

Figure 17:
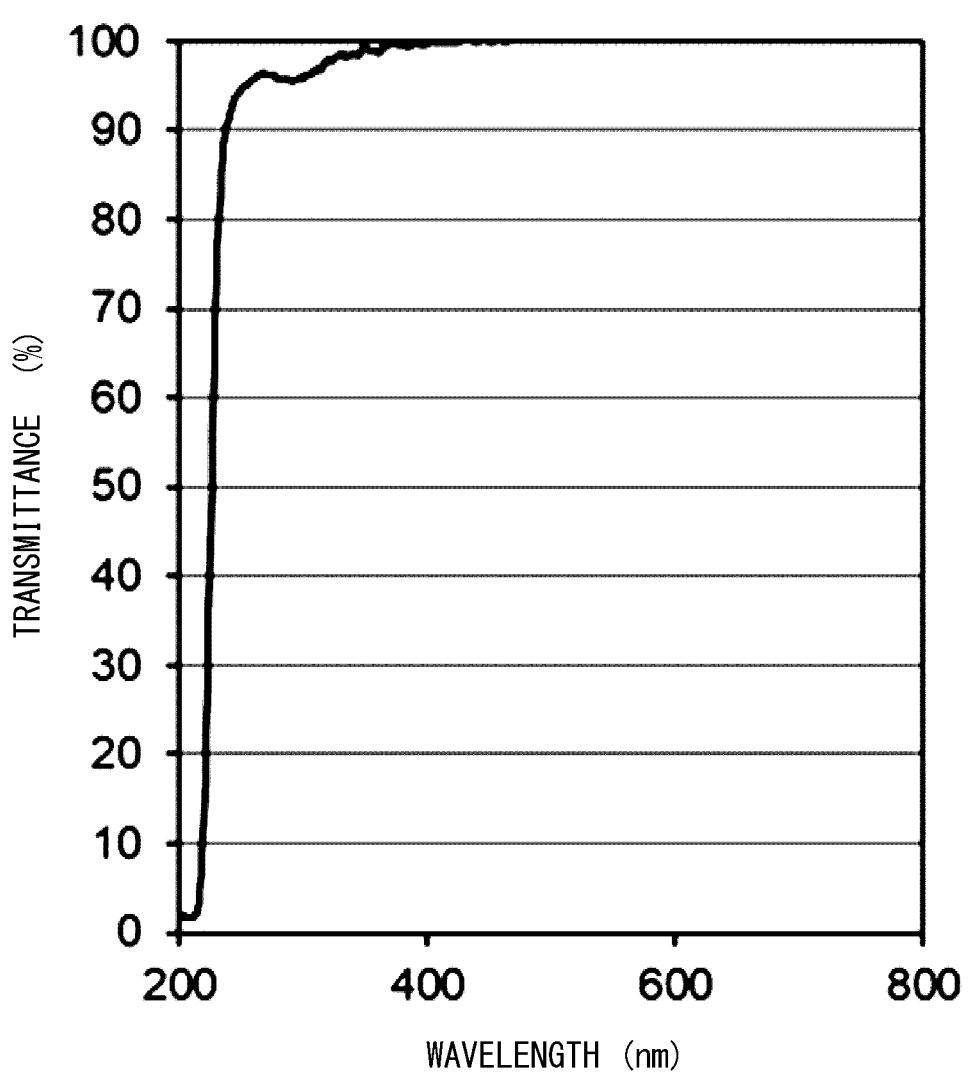
FIG. 17 is a view showing the measurement result of the spectral transmittance of a calcium fluoride sintered body in the example.

FIG. 17 is a view showing the measurement result of the spectral transmittance of the calcium fluoride sintered body of the sample 25. The transmittance shown in FIG. 17 is the internal transmittance per thickness of 10 mm of the sample. In other words, the transmittance is the internal transmittance per distance of 10 mm that light actually traveled in the sample. As shown in FIG. 17, in the calcium fluoride sintered body of the sample 25, the internal transmittance of light having wavelengths of 380 nm to 780 nm is 90% or more.

As described above, the calcium fluoride sintered bodies of the present examples were polycrystalline substances and had high transmittances.

Comparative Example 1

For a calcium fluoride sintered body in Comparative Example 1, similar to the examples, calcium acetate hydrate was used as a calcium compound, and hydrofluoric acid was used as a fluorine compound. On the calcium fluoride sintered body of Comparative Example 1, the step described as the step S6 was not performed. That is, the calcium fluoride sintered body was produced using calcium fluoride particles generated without providing a step of stirring calcium fluoride particles and distilled water to separate the liquid mixture into solid and liquid, then, removing a supernatant, then, pouring distilled water thereinto and stirring the components. In Comparative Example 1, a transparent calcium fluoride sintered body was obtained by a HIP treatment, but a number of approximately 0.1 mm white spots, which were clusters of fine bubbles, were observed in the sintered body.

Figure 14A:
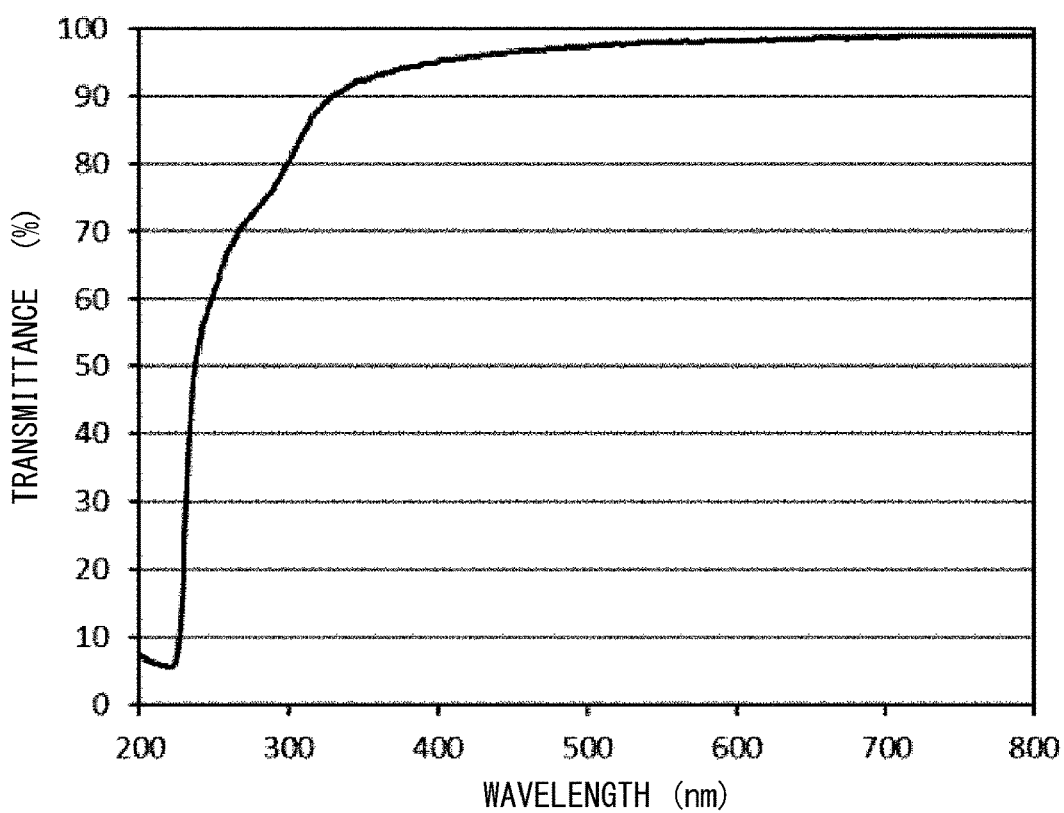
FIG. 14A is a view showing the measurement result of the spectral transmittance of a calcium fluoride sintered body in Comparative Example 1.
Figure 14B:
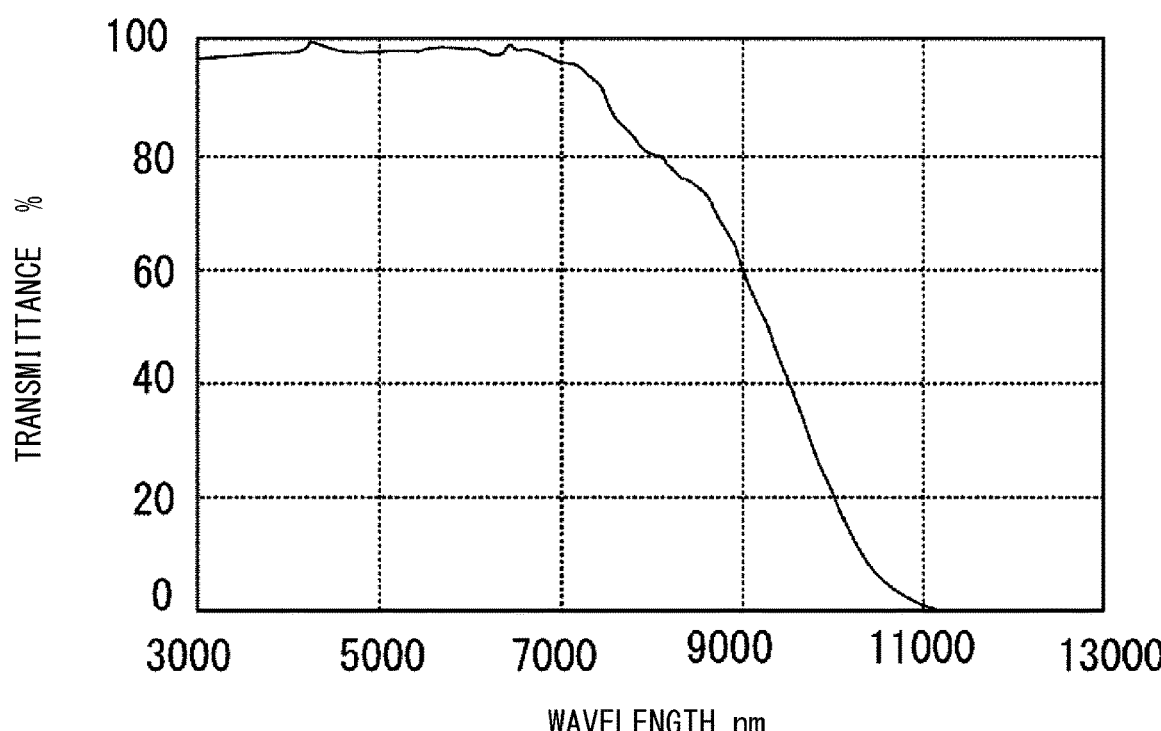
FIG. 14B is a view showing the measurement result of the spectral transmittance of the calcium fluoride sintered body in Comparative Example 1.

FIGS. 14A and 14B are views showing the measurement result of the spectral transmittance of the calcium fluoride sintered body of Comparative Example 1. The transmittance shown in FIGS. 14A and 14B is the internal transmittance per thickness of 10 mm of the sample. In other words, the transmittance is the internal transmittance per distance of 10 mm that light actually traveled in the samples. FIG. 14A shows the measurement result of the spectral transmittance of light having wavelengths of 200 nm to 800 nm, and FIG. 14B shows the measurement result of the spectral transmittance of light having wavelengths of 3000 nm (3 $\mu$m) to 13000 nm (13 $\mu$m). In the calcium fluoride sintered body of Comparative Example 1, the internal transmittance of light having a wavelength of 550 nm per thickness of 10 mm was 97.7%, which was less than 98%.

Comparative Example 2

For a calcium fluoride sintered body in Comparative Example 2, similar to the examples, calcium acetate hydrate was used as a calcium compound, and hydrofluoric acid was used as a fluorine compound. The calcium fluoride sintered body of Comparative Example 2 was produced using calcium fluoride particles generated without performing the mixing step described as the step S5. In the obtained calcium fluoride sintered body of Modification Example 2, a foreign matter was generated.

Figure 15A:
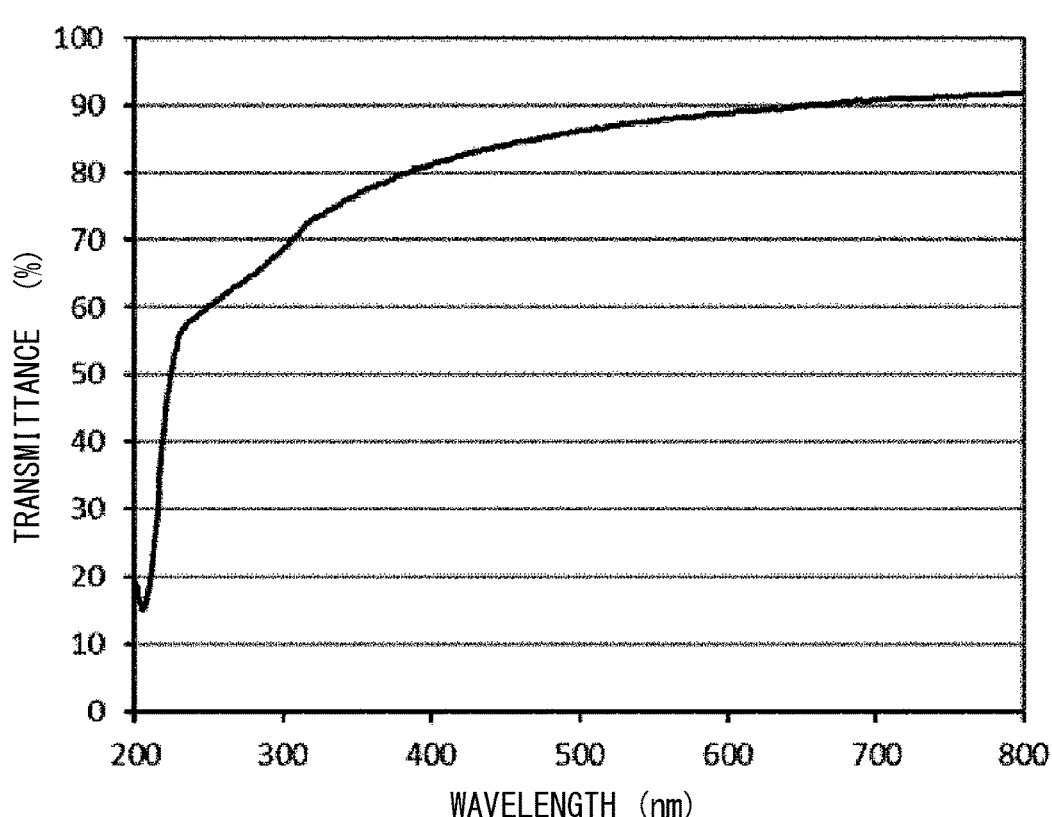
FIG. 15A is a view showing the measurement result of the spectral transmittance of a calcium fluoride sintered body in Comparative Example 2.
Figure 15B:
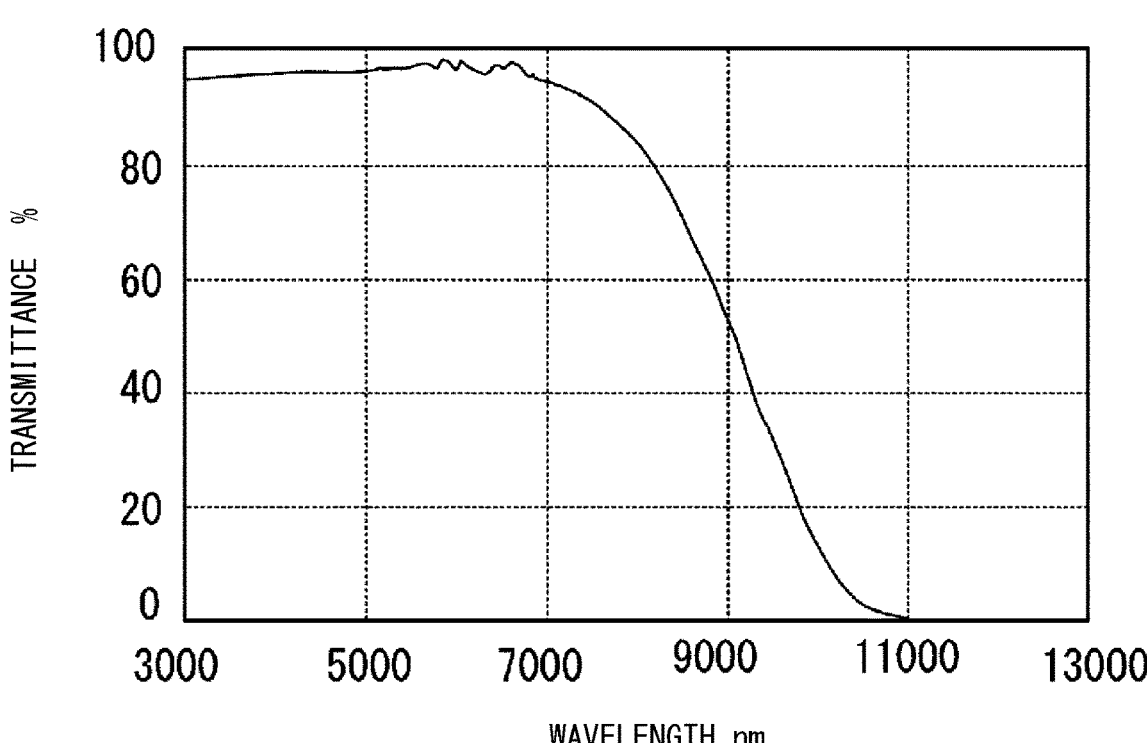
FIG. 15B is a view showing the measurement result of the spectral transmittance of the calcium fluoride sintered body in Comparative Example 2.

FIGS. 15A and 15B are views showing the measurement result of the spectral transmittance of the calcium fluoride sintered body of Comparative Example 2 having both surfaces polished. The transmittance shown in FIGS. 15A and 15B is the internal transmittance per thickness of 10 mm of the sample. In other words, the transmittance is the internal transmittance per distance of 10 mm that light actually traveled in the samples. FIG. 15A shows the measurement result of the spectral transmittance with respect to light having wavelengths of 200 nm to 800 nm, and FIG. 15B shows the measurement result of the spectral transmittance with respect to light having wavelengths of 3000 nm (3 μm) to 13000 nm (13 μm). As shown in FIGS. 15A and 15B, the range of the wavelengths of light where the internal transmittance reaches 90% or more is a narrower range than those in the case of the examples. In addition, in the calcium fluoride sintered body of Comparative Example 2, the internal transmittance of light having a wavelength of 550 mu per thickness of 10 mm was 87.7%, which was less than 98%.

The present invention is not limited to the above-described embodiment as long as the characteristics of the present invention are not impaired, and other forms that are conceivable within the scope of the technical idea of the present invention are also included in the scope of the present invention.

What is claimed is:

1. A calcium fluoride polycrystalline substance, wherein an internal transmittance of light having a wavelength of 550 nm per thickness of 10 mm is 98% or more.

2. The calcium fluoride polycrystalline substance according to claim 1, wherein an internal transmittance of light having wavelengths of 380 nm to 780 nm per thickness of 10 mm is 90% or more.

3. The calcium fluoride polycrystalline substance according to claim 1, wherein an internal transmittance of light having a wavelength of 3 μm to 7 μm per thickness of 10 mm is 90% or more.

4. The calcium fluoride polycrystalline substance according to claim 1, wherein, in an infrared region, a wavelength $IR\lambda_{80}$ at which an internal transmittance per thickness of 10 mm becomes 80% or more is 8 μm or longer.

5. The calcium fluoride polycrystalline substance according to claim 1, wherein an optical strain is 25 nm/cm or less.

6. The calcium fluoride polycrystalline substance according to claim 1, wherein an optical strain is 10 nm/cm or less.

7. The calcium fluoride polycrystalline substance according to claim 1, wherein a relative density is 98% or higher.

8. An optical element, wherein the calcium fluoride polycrystalline substance according to claim 1 is used.

9. An optical system comprising: the optical element according to claim 8.

10. An interchangeable lens comprising: the optical system according to claim 9.

11. An optical device comprising: the optical system according to claim 9.

12. A calcium fluoride polycrystalline substance according to claim 1, wherein composed of calcium and fluorine.

13. A production method of a calcium fluoride particle, comprising:
a generation step of generating a dispersion liquid containing calcium fluoride particles by reacting a calcium compound and a fluorine compound in a solution;
a mixing step of mixing the obtained calcium fluoride particles and hydrofluoric acid which is different from the fluorine compound used in the generation step; and
a separation step of separating the calcium fluoride particles and the water after adding water to the calcium fluoride particles after the mixing step.

14. The production method of a calcium fluoride particle according to claim 13, wherein a concentration of hydrogen fluoride in the hydrofluoric acid is 0.1% or higher and 20% or lower.

15. The production method of a calcium fluoride particle according to claim 13, wherein a mole ratio of the fluorine compound to the calcium compound in the generation step is 2.4 or more and 5.0 or less.

16. The production method of a calcium fluoride particle according to claim 13, further comprising:
a heating and pressurization step of heating and pressurizing the dispersion liquid after the generation step.

17. The production method of a calcium fluoride particle according to claim 16, wherein a heating temperature in the heating and pressurization step is 100° C. or higher and 180° C. or lower.

18. The production method of a calcium fluoride particle according to claim 16, wherein a heating time in the heating and pressurization step is 10 hours or longer and 24 hours or shorter.

19. A production method of a calcium fluoride polycrystalline substance comprising:
a molding step of molding calcium fluoride particles produced by the production method of a calcium fluoride particle according to claim 13 to form a compact; and
a sintering step of sintering the compact in an inert atmosphere to generate a polycrystalline substance.

20. The production method of a calcium fluoride polycrystalline substance according to claim 19, wherein, in the molding step, the calcium fluoride particles having a predetermined particle diameter or smaller are molded to form the compact.

21. The production method of a calcium fluoride polycrystalline substance according to claim 20, wherein, in the molding step, the calcium fluoride particles having a particle diameter of 1 mm or smaller are molded to form the compact.

22. The production method of a calcium fluoride polycrystalline substance according to claim 19, wherein, in the molding step, the calcium fluoride particles are pressed at a pressure of 1 kN or higher, thereby forming the compact.

23. The production method of a calcium fluoride polycrystalline substance according to claim 19, wherein, in the molding step, the calcium fluoride particles are molded by being put into a container having a predetermined shape and dried at 70° C. or higher and 300° C. or lower.

24. The production method of a calcium fluoride polycrystalline substance according to claim 19, wherein, in the sintering step, the compact having a relative density of 35% or higher and 50% or lower is sintered at 400° C. or higher and 700° C. or lower for two hours or longer and six hours or shorter and then sintered at 900° C. or higher and 1000° C. or lower in an inert atmosphere for one hour or longer and two hours or shorter.

25. The production method of a calcium fluoride polycrystalline substance according to claim 19, further comprising:

a making-transparent step of making the polycrystalline substance transparent by heating the polycrystalline substance to 1000° C. or higher and 1100° C. or lower under application of a pressure of 100 MPa in an inert atmosphere after the sintering step.

26. The production method of a calcium fluoride polycrystalline substance according to claim 25, further comprising:

an annealing step of annealing the polycrystalline substance in an inert atmosphere after the making-transparent step.

27. The production method of a calcium fluoride polycrystalline substance according to claim 26, wherein the annealing step is performed in a temperature range of 600° C. or higher and 800° C. or lower for a heating time of 40 hours or longer.

28. The production method of a calcium fluoride polycrystalline substance according to claim 19, wherein, in the sintering step, the compact having a relative density of 35% or higher and 50% or lower is sintered at 400° C. or higher and 700° C. or lower for two hours or longer and six hours or shorter and then sintered at 900° C. or higher and 1000° C. or lower in an inert atmosphere for one hour or longer and two hours or shorter; and a making-transparent step of making the polycrystalline substance transparent by heating the polycrystalline substance to 1000° C. or higher and 1100° C. or lower under application of a pressure of 100 MPa in an inert atmosphere after the sintering step.

29. The production method of a calcium fluoride polycrystalline substance according to claim 28, wherein, in the sintering step, the compact having a relative density of 35% or higher and 50% or lower is sintered.

30. The production method of a calcium fluoride polycrystalline substance according to claim 13, wherein the calcium compound is calcium nitrate.

* * * * *